(12) United States Patent
Powell

(10) Patent No.: US 9,945,988 B2
(45) Date of Patent: Apr. 17, 2018

(54) ARRAY-BASED CAMERA LENS SYSTEM

(71) Applicant: Microsoft Technology Licensing, LLC, Redmond, WA (US)

(72) Inventor: Karlton D. Powell, Lake Stevens, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/354,194

(22) Filed: Nov. 17, 2016

(65) Prior Publication Data

US 2017/0261651 A1 Sep. 14, 2017

Related U.S. Application Data

(60) Provisional application No. 62/305,307, filed on Mar. 8, 2016.

(51) Int. Cl.
*H04N 5/225* (2006.01)
*G02B 3/00* (2006.01)
(Continued)

(52) U.S. Cl.
CPC ......... *G02B 3/0062* (2013.01); *G02B 3/0056* (2013.01); *G02B 3/0075* (2013.01);
(Continued)

(58) Field of Classification Search
CPC .............. G02B 3/0062; G02B 27/2292; G02B 3/0075; G02B 3/0056; G02B 13/26; H04N 5/2254
See application file for complete search history.

(56) References Cited

U.S. PATENT DOCUMENTS

| 2,351,034 | A |   | 6/1944  | Gabor |
|-----------|---|---|---------|-------|
| 5,270,859 | A | * | 12/1993 | Wirth ............... G02B 3/0062 |
|           |   |   |         | 359/419 |

(Continued)

FOREIGN PATENT DOCUMENTS

| KR | 20090009588 | 1/2009 |
| KR | 20140012396 | 2/2014 |

(Continued)

OTHER PUBLICATIONS

Brady, et al., "Multiscale lens design", In Proceedings of Optics Express, vol. 17, No. 13, Jun. 10, 2009, pp. 10659-10674.

(Continued)

*Primary Examiner* — Hung Lam
(74) *Attorney, Agent, or Firm* — Lempia Summerfield Katz LLC

(57) ABSTRACT

A lens system includes a first lens array assembly including a first plurality of cells, each cell of the first plurality of cells configured to exhibit a pair of first Fourier transform lenses, and a second lens array assembly including a second plurality of cells, each cell of the second plurality of cells configured to exhibit a pair of second Fourier transform lenses. The first Fourier transform lenses have a first pitch. The second Fourier transform lenses have a second pitch differing from the first pitch. The first and second lens array assemblies are positioned relative to one another along an optical axis of the lens system such that a Fourier transform of light from an object is developed at a plane between the first and second lens array assemblies and an image of the object is provided at an image conjugate distance from the second lens array assembly.

20 Claims, 7 Drawing Sheets

(51) Int. Cl.
  *G02B 27/22* (2018.01)
  *G02B 13/26* (2006.01)
(52) U.S. Cl.
  CPC ....... *G02B 27/2292* (2013.01); *H04N 5/2254* (2013.01); *G02B 13/26* (2013.01)

(56) References Cited

U.S. PATENT DOCUMENTS

| | | | |
|---|---|---|---|
| 5,291,334 A | 3/1994 | Wirth et al. | |
| 5,579,161 A | 11/1996 | Sekiguchi | |
| 5,621,572 A | 4/1997 | Fergason | |
| 5,731,899 A | 3/1998 | Meyers | |
| 5,973,844 A | 10/1999 | Burger | |
| 6,124,974 A * | 9/2000 | Burger | G02B 3/0056 359/621 |
| 6,124,975 A * | 9/2000 | Dona | B44F 1/06 359/619 |
| 6,317,037 B1 | 11/2001 | Ayres et al. | |
| 6,381,072 B1 * | 4/2002 | Burger | G02B 3/0056 359/621 |
| 6,796,656 B1 | 9/2004 | Dadourian | |
| 6,842,297 B2 | 1/2005 | Dowski, Jr. | |
| 6,937,221 B2 | 8/2005 | Lippert et al. | |
| 7,042,645 B2 | 5/2006 | Houlihan et al. | |
| 7,116,405 B2 | 10/2006 | Johnson | |
| 7,186,004 B2 | 3/2007 | Powell et al. | |
| 7,274,808 B2 | 9/2007 | Baharav et al. | |
| 7,589,900 B1 | 9/2009 | Powell | |
| 7,839,573 B2 * | 11/2010 | Wippermann | G02B 27/01 359/619 |
| 7,956,924 B2 | 6/2011 | Georgiev | |
| 7,986,315 B2 | 7/2011 | Sprague et al. | |
| 8,085,218 B2 | 12/2011 | Heisch | |
| 8,120,858 B2 | 2/2012 | Choi et al. | |
| 8,299,980 B2 | 10/2012 | Takahashi et al. | |
| 8,622,549 B2 | 1/2014 | Linden et al. | |
| 8,670,171 B2 | 3/2014 | Martin et al. | |
| 8,711,466 B2 | 4/2014 | Kroll et al. | |
| 8,715,079 B1 | 5/2014 | Loose | |
| 8,867,136 B2 | 10/2014 | Hashikawa | |
| 9,030,503 B2 | 5/2015 | Moore | |
| 9,049,381 B2 | 6/2015 | Venkataraman et al. | |
| 2002/0034014 A1 | 3/2002 | Gretton et al. | |
| 2004/0013341 A1* | 1/2004 | Hall | H04B 10/801 385/16 |
| 2005/0248849 A1 | 11/2005 | Urey et al. | |
| 2006/0077319 A1* | 4/2006 | Kitamura | G02F 1/133526 349/95 |
| 2006/0232747 A1 | 10/2006 | Thornton et al. | |
| 2007/0103747 A1 | 5/2007 | Powell et al. | |
| 2007/0159700 A1 | 7/2007 | Danner et al. | |
| 2008/0001850 A1 | 1/2008 | Champion et al. | |
| 2009/0115989 A1* | 5/2009 | Tanaka | G03F 7/70566 355/71 |
| 2009/0190098 A1 | 7/2009 | DeJong et al. | |
| 2009/0231698 A1 | 9/2009 | Hashimoto et al. | |
| 2009/0262182 A1 | 10/2009 | Javidi et al. | |
| 2010/0079861 A1 | 4/2010 | Powell | |
| 2010/0245345 A1 | 9/2010 | Tomisawa et al. | |
| 2010/0271290 A1 | 10/2010 | Tomisawa et al. | |
| 2010/0315597 A1 | 12/2010 | Powell et al. | |
| 2012/0105310 A1 | 5/2012 | Sverdrup et al. | |
| 2012/0300273 A1 | 11/2012 | Lin | |
| 2013/0003022 A1 | 1/2013 | Tanaka et al. | |
| 2013/0285885 A1 | 10/2013 | Nowatzyk et al. | |
| 2013/0341493 A1 | 12/2013 | Ando et al. | |
| 2014/0376097 A1 | 12/2014 | Yamashita et al. | |
| 2015/0049383 A1 | 2/2015 | Janins et al. | |

FOREIGN PATENT DOCUMENTS

| | | |
|---|---|---|
| WO | 2014048999 A1 | 4/2014 |
| WO | 2014133481 | 9/2014 |

OTHER PUBLICATIONS

Aldalali, et al., "A micro camera utilizing a microlens array for multiple viewpoint imaging", In Proceedings of 16th International Solid-State Sensors, Actuators and Microsystems Conference, Jun. 5, 2011, 4 pages.
Rajasekharan, et al., "Analysis of an array of micro lenses using Fourier-transform method", In Proceedings of IET Optoelectronics, vol. 4, Issue 5, Oct. 2010, pp. 210-215.
Hembd-Sölner, et al., "Imaging properties of the Gabor superlens", In Journal of Optics A: Pure and Applied Optics vol. 1 No. 1, Jan. 1991, 2 pages.
Stollberg, et al., "The Gabor superlens as an alternative waferlevel camera approach inspired by superposition compound eyes of nocturnal insects", In Proceedings of Optics Express, vol. 17, Issue 18, Aug. 31, 2009, pp. 15747-15759.
Urey, et al., "Microlens array-based exit pupil expander for full-color display applications", In Proceedings of SPIE—the International Society for Optical Engineering, vol. 5456, Apr. 2004.
"Anti-reflective glass (AR-Glass)", Retrieved on: Aug. 25, 2015Available at: http://biz.everychina.com/shanghai_manbo-r/z6504064-ag_glass_anti_glare_glass_html.
"Compact Microoptical Imaging System for Digital Close-Up Imaging", Retrieved on: Jun. 15, 2015, Available at:http://www.iof.fraunhofer.de/content/dam/iof/en/documents/pb/Compact%20Microoptical%20Imaging%20System%20for%20Digital%20Close-Up%20Imaging.pdf.
"International Search Report & Written Opinion Issued in PCT Application No. PCT/US2017/020058", dated Jun. 1, 2017, 13 Pages.
"International Search Report & Written Opinion Issued in PCT Application No. PCT/US2017/020059", dated Jun. 1, 2017, 17 Pages.
"SELFOC® Lens Array", Retrieved on: Jun. 15, 2015, Available at: http://welcome.gofoton.com/product/lens_array/.
Bruckner, et al., "Ultra Compact Close up Microoptical Imaging System", In Proceedings of Current Developments in Lens Design and Optical Engineering XI; and Advances in Thin Film Coatings VI, Aug. 19, 2010, 3 pages.
Lanman, et al., "Near-Eye Light Field Displays", ournal of ACM Transactions on Graphics, Nov. 2013, 10 pages, vol. 36, Issue 6.
Meyer, et al., "Optical Cluster Eye Fabricated on Wafer-Level", Optics Express, Aug. 22, 2011, pp. 17506-17519, vol. 19, Issue 18.
Mungan, C.E., "The Cat's Eye Retroreflector", Retrieved on: Dec. 7, 2015, Available at: http://www.usna.edu/Users/physics/mungan/_files/documents/Scholarship/Retroreflector.pdf.
Park, et al., "Compact Near-Eye Display System Using a Superlens-based Microlens Array Magnifier", IEEE 28th International Conference on Micro Electro Mechanical Systems, Jan. 18, 2015, pp. 952-955.
Shaoulov, et al., "Compact Microlenslet-Array-Based Magnifier", Optics Letters, Apr. 1, 2004, pp. 709-711, vol. 29, Issue 7.
Spring et al., "Confocal Microscope Scanning Systems", Available at: http://www.olympusconfocal.com/theory/confocalscanningsystems.html.
Tsvetkov. A. D. "Catadioptric Retroreflector", In Journal of Optical Technology, vol. 78, Issue 3, Mar. 2011, 3 pages.
U.S. Appl. No. 14/538,783, Powell, et al., "High Accuracy Corner Cube Arrays for High Resolution Retroreflective Imaging Applications", filed Nov. 11, 2014.
U.S. Appl. No. 14/588,792, Powell, et al., "Retro-Imaging System Having High Efficiency Through Control of Polarization with Minimized Polarization-Filtering Induced Diffractive Artifacts Impacting Resolve", filed Jan. 2, 2015.
Wu et al., "100% Fill-Factor Aspheric Microlens Arrays (AMLA) With Sub-20-nm Precision", IEEE Photonics Technology Letters, Aug. 18, 2009, pp. 1535-1537, vol. 21, Issue 20.
Yamamoto et al., "Aerial 3D LED Display by Use of Retroreflective Sheeting", SPIE-IS&T Electronic Imaging, 2013, 8 pages, vol. 8648.

(56) References Cited

OTHER PUBLICATIONS

Yamamoto, et al., "Aerial LED signage by use of crossed-mirror array", In Proceedings of SPIE, Advances in Display Technologies III, vol. 8643, Mar. 1, 2013.

Yamamoto, et al., "Design of crossed-mirror array to form floating 3D lens signs", In Proceedings of SPIE, Stereoscopic Displays and Applications XXIII, vol. 8288, Feb. 6, 2012.

Yamamoto, et al., "Floating Aerial LED Signage Based on Aerial Imaging by Retro-Reflection (AIRR)", In Journal of Optics Express, vol. 22, Issue 22, Oct. 23, 2014, pp. 26919-26924.

Yeom, et al., "Viewing window expansion in integral floating display using tilted side mirrors", In Proceedings of 3DTV Conference: The True Vision—Capture, Transmission and Display of 3D Video, May 16, 2011, 4 pages.

\* cited by examiner

ND BASED CAMERA LENS SYSTEM

CROSS-REFERENCE TO RELATED APPLICATION

This application claims the benefit of U.S. provisional application entitled "Array-Based Camera Lens System," filed Mar. 8, 2016, and assigned Ser. No. 62/305,307, the entire disclosure of which is hereby expressly incorporated by reference.

DESCRIPTION OF THE DRAWING FIGURES

For a more complete understanding of the disclosure, reference is made to the following detailed description and accompanying drawing figures, in which like reference numerals may be used to identify like elements in the figures.

Figure 1:
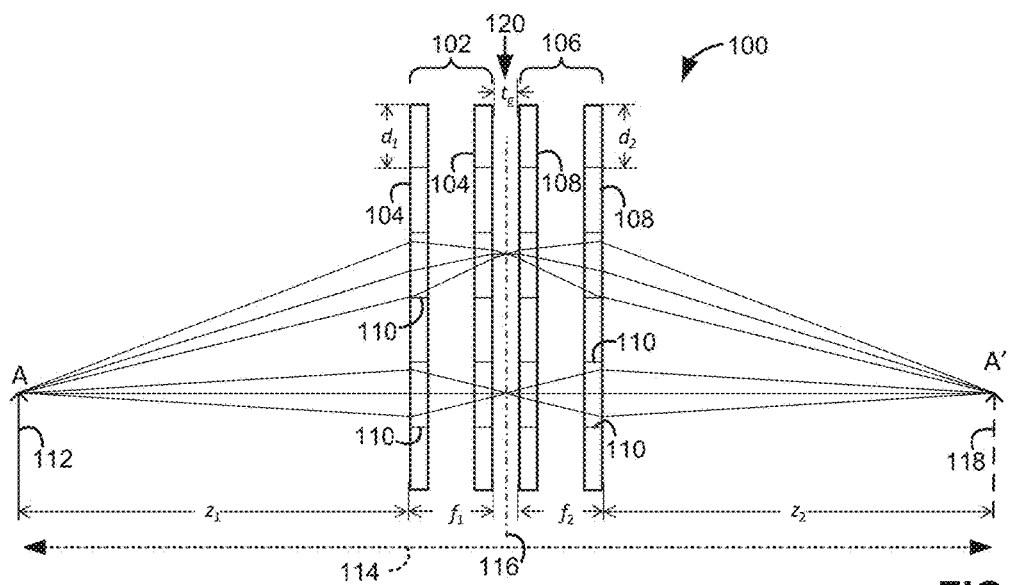
FIG. 1 is a schematic view of a lens system having two lens array assemblies with cells that exhibit Fourier transform lenses in accordance with one example.

The disclosed devices may assume various forms. Specific examples are illustrated in the drawing (and are hereafter described) with the understanding that the disclosure is intended to be illustrative, and is not intended to limit the invention to the specific examples described and illustrated herein.

DETAILED DESCRIPTION

Image capture involves the transfer of light of an object such as a source, mask or sample to a photodetector array, substrate, or other image sensor or light-sensitive medium. Optical systems use an arrangement of lenses to focus the object light on the light-sensitive medium. The lens arrangement establishes the total conjugate length of the optical system—the total track length of object plane to image plane—to image a given conjugate distance. The total track length may become long in some cases. The resulting optical systems are accordingly too bulky for many applications, such as cameras in thin profile devices like smartphones and other handheld devices.

Cameras and other lens systems that provide image capture and other imaging via stacks or assemblies of lens arrays, such as microlens arrays (MLAs), are described. The lens arrays of the systems handle the imaging of input object light in a piecewise manner. The MLAs of the stacks are assembled such that conelets of light are stitched into a complete numerical aperture (NA) without gapping or breaks. Erect, high efficiency imaging is achieved.

The lens system includes an imaging core of two lens array assemblies. In some cases, each assembly includes a pair of in-tandem MLAs. The MLAs of each pair are, in turn, separated by the focal length of the constituent lenslets (e.g., array elements) of the MLAs. The MLAs may thus be disposed in a compact stack configuration. For example, one lens system has a total track length of 4.3 mm. The lens systems are accordingly capable of imaging large areas while avoiding the large volumes and bulky limitations of classical lens systems. The lens systems also provide such imaging with fewer parts than other imaging systems.

The lens array stacks may be planar or substantially planar. As a result, the lens arrays may be placed closer to an image sensor. Compact lens systems may thus be realized for thin form factor cameras and other applications. For instance, the lens systems may be useful in the camera modules of phone, tablet, and other portable and/or thin devices. The lens array stacks may thus avoid compromises made in systems using more bulky optical systems, such as relying upon smaller and lower resolution sensors.

The focal length separation of the two in-tandem pairs leads to high efficiency imaging. Each in-tandem pair implements a full, true Fourier transform between position space and angle space (or spatial frequency space). A transformation into angle space is provided by the first pair at an intermediate transform plane between the two pairs. The second pair then implements a second transformation from angle space back to position space to provide the erect image at an image distance determined as a function of (i) the focal lengths of the MLAs, (ii) the pitches of the MLAs, and (iii) the distance between the two pairs, for a given object distance. The function may thus be used to configure the lens system arrangement to form the image at a desired image distance. As described herein, formation of a real, non-inverted image is provided by satisfying the following two constraints: (1) providing consistent imaging conjugate distances within an array element, and (2) convergence of image content across multiple imaging elements within the array.

Implementing a full Fourier transform avoids losses and other distortions by addressing the diffraction arising in connection with each MLA. Without the second MLA for each cell, the transform appears to be a Fourier Transform (FT) in intensity, but not in phase, as a quadratic phase error remains. Phase correction is provided by the second MLA of each pair, which, in some cases, effectively provides telecentric correction of the output. The inner array of each in-tandem FT MLA pair prevents loss and scatter of light having higher spatial frequency content, or light having higher angle of incidence, at the intermediate transform plane. Without phase correction at these inner arrays, a portion of light involved in fully resolving the object (within the diffraction limit defined by lenslet acceptance numerical aperture NA) would be lost. By making use of in-tandem FT MLA pairs, apodization is accordingly avoided, thereby reducing diffractive artifacts and minimizing loss of system resolve or loss of optical performance, such as Modulation Transfer Function (MTF) losses. The lens systems described herein thus account for the impacts of diffraction. The fully formed diffraction output of the first in-tandem pair is then fully utilized by the second in-tandem pair to instead improve the efficiency of the lens system and, thus, image quality. Clipping and vignetting are also avoided via the phase correction. The MLA-based lens system is instead capable of stitching conelets of light into a complete numerical aperture (NA) without angular gaps.

Higher efficiencies may also be attained due to a higher fill factor of the MLAs. Some microlens arrays are capable of being molded with 100% fill factor. For example, microlens arrays formed by replication using an etched master, by molding using a master which was fabricated using diamond machining as part of the mastering process, or by direct diamond machining may achieve 100% fill factor, while microlens arrays formed by photoresist reflow will have flat gaps between lenslets, and microlens arrays formed by grey-scale lithography may exhibit rounded seams at the edges of each lenslet causing scatter. Other solutions, such as GRIN rod arrays, have a 10% loss in fill factor arising from hexagonal packing of round rods. Further, arrays of round lenses have similar gaps in fill factor. By making use of high fill factor types of MLAs or GRIN fiber faceplates from boules (or preforms), or arrays of lenses, such as miniature or micro lenses or GRIN lenses, each having a shape suitable for tiling, including hexagonal, rectangular and square shapes, high efficiency may be maintained. MLAs may utilize aperture array masking at any plane within the stack to help reduce scatter of input light higher than the acceptance of each lenslet, while extra-mural absorption (EMA) glass or fiber may be utilized periodically within, e.g., a GRIN fiber array to reduce such scatter.

The arrangement of the MLA pairs provides output without a tiling effect, the so-called lensitization arising from lens system acceptance and pointing angle. The tiling effect is avoided without having to resort to extensive increases in overall system length. The lens systems may therefore be provided in a compact, or thin, form factor (e.g., a stack of sheets or thin films) appropriate for electronic devices, such as phones, tablets, laptops, and other devices having a thin profile for portability and/or other reasons.

The imaging of the lens systems is capable of being achieved in a non-contact manner. For example, a lens or other optical element is not necessary at the image plane. Such non-contact imaging is useful when imaging through transparent media, e.g., transfers through windows. The lack of contact is also useful in connection with transfers to substrates, as in the case of, for instance, photolithography or transfers to an image sensor such as a video microscope.

The lens systems are scalable without increases in system volume. The lens systems are capable of being scaled to handle larger lateral areas without any increase in track length. The thickness of the lens system thus does not increase. The lens systems may also be scaled to accommodate different object conjugate distances without significant increases in volume. Such scaling may also be useful in connection with imaging at short conjugate lengths. For instance, total conjugate lengths less than 9 mm are achievable.

The lens systems are telecentric in some cases. For example, the two in-tandem MLA pairs may be arranged to provide telecentric output for objects that are sufficiently far enough away from the lens system. Telecentric output is achieved without having to rely on a physical layer (e.g., a field lens) at the image plane. The lens systems accordingly avoid introducing mechanical interference issues in connection with, for instance, photolithography (e.g., avoiding contact with the wafer being exposed). In other cases, field correction may be used to achieve symmetric behavior. Input and output may be substantially telecentric. The ability to provide telecentric output avoids distortion and defocusing present in previous lens systems.

The two in-tandem MLA pairs of the lens systems may be arranged to provide unity or non-unity magnification. The respective focal lengths or respective pitches of the MLA pairs differ in non-unity magnification examples.

In some cases, the imaging of the lens systems is provided in connection with camera imaging, such as by including use of an image sensor. An array-based camera lens system includes two in-tandem MLA pairs. The stack of MLAs is thin, leading to a compact video microscope or a compact camera. For instance, the lens system is sufficiently thin to be disposed within various portable electronic devices. The lens system may be scaled laterally.

In some cases, the camera and other lens systems allow for a smooth change in chief ray angle (CRA) versus position across an image sensor. The chief ray angle, at the image sensor plane, of the stitched focus cone NA may vary with position across the image sensor, and may range from completely telecentric, thus having a pointing angle substantially normal to the image sensor plane for all positions across the sensor, to non-telecentric, thus having a pointing angle that varies from being substantially normal, or near 0 degrees angle of incidence (AOI), near the center of image sensor and having increased AOI for positions on the image sensor that are radially further away from the image sensor center. For instance, for the non-telecentric design case, the pointing angle may fan outward versus position at the sensor such that the cone NA bundles of light are more smoothly refracted and directed to capturing the outer fields of view with smoother transition between image conjugates. In some cases, the pointing angle of the CRA may be matched to the field of view angles, providing a matching fan out, while in other cases, the pointing angle may be transitioned more smoothly as an intermediate step within the array stack, thus between purely telecentric and non-telecentric having pure fan out.

Although described in connection with camera lens systems for portable electronic devices (e.g., tablets), the camera lens systems are well suited for a wide variety of camera applications and other usage scenarios. For instance, the lens systems may not include an image sensor in some applications or scenarios. For example, one application involves photolithography, in which the image is transferred to a photo-sensitive layer supported by a substrate.

The lens systems are not limited to particular types of MLA-based array assemblies. Other types of lensing structures and arrays may be used for each one of the lens array assemblies. For instance, each lens array assembly may include an array of GRIN microlensing structures. Each GRIN microlensing structure of the array then corresponds with a respective one of the cells of each lens array assembly. As used herein, the term "cell" is used to refer to a unit of each array assembly. Because, in some cases, an array assembly includes a pair of arrays, a cell may include an FT pair of array elements, one from each array. In other cases (e.g., GRIN cases), a cell corresponds with a single element of the array that provides the equivalent of an FT lensing pair. A GRIN lens length is often stated in terms of optical pitch p, which corresponds to fractions of sinusoidal-like divergence and convergence from defocus and toward focus in a cyclic fashion, and a length of 0.25p would represent a lens z length that may collimate an input point source or, vice versa, focus a collimated input beam. The pitch of a GRIN lens is often referred to as the spatial frequency of ray trajectory, or an optical length representing one cycle of the sinusoidal-like wave of convergence and divergence to and from focus, thus, a GRIN lens having pitch 0.25p, or ¼ pitch, corresponds closely to an FT equivalent length. In such cases, two arrays of GRIN lenses, each having an optical length of pitch 0.25p, may be used to form an array-based imaging system as described herein.

FIG. 1 is a schematic view of a lens system 100 configured for use in a camera or other imaging system. The lens system 100 includes two lens array assemblies. In this example, one assembly of the lens array assemblies of the lens system 100 includes a first pair 102 of in-tandem microlens arrays 104. The other assembly of the lens array assemblies 100 includes a second pair 106 of in-tandem microlens arrays 108. Each lens array assembly has a plurality of cells. As described below, each cell is configured to exhibit a pair of Fourier transform lenses. In this example, each microlens array 104, 108 includes a respective set of constituent lenslets 110, respective pairs of which make up each cell of the lens array assemblies.

Light from an object 112 diffuses as it approaches the lens system 100. The object 112 is separated from the lens system 100 by an object distance $z_1$. A few example rays of light are shown in FIG. 1. The example rays propagate from a point A on the object 112 toward the first pair 102 of arrays 104. In many cases, light from the object 112 encounters each of the lenslets 110 to the extent permitted by the numerical aperture, or acceptance cone, of the microlens array 104.

The microlens arrays 104, 108 of the two array pairs 102, 106 are positioned to provide an image of the object light. Each array 104, 108 is generally disposed, or oriented, along a respective plane, as shown in FIG. 1. The respective planes and, thus, the arrays 104, 108 are separated from one another along an optical axis 114. The arrays 104 of the first pair 102 are spaced from one another by a distance $f_1$. The arrays 108 of the second pair 106 are spaced from one another by a distance $f_2$. The array pairs 102, 106 are spaced from one another by a distance $t_g$ (or D). Each distance is an effective optical distance determined in accordance with the refractive index of the medium through which light passes when transmitted over the particular distance. Each distance is selected in accordance with a function that establishes the image conjugate distance for the imaging of the lens system 100. The image conjugate distance is establishing by satisfying the constraints of (1) providing imaging conjugate distances along the optical path within a given lenslet, or thus within an imaging cell having two in-tandem lenslets, as well as (2) convergence of image content across multiple imaging cells within the assembly, thereby enabling formation of a real, non-inverted image.

The distances $f_1$ and $f_2$ are set in accordance with the focal lengths for the cells, e.g., the lenslets 110 of the arrays 104, 108. The distance $f_1$ is the common focal length of the cells of the first lens array assembly, e.g., the lenslets 110 of the arrays 104. The distance $f_2$ is the common focal length of the cells of the second lens array assembly, e.g., the lenslets 110 of the arrays 108. The distances $f_1$ and $f_2$ are both effective focal lengths of the cells, and account for the refractive index of optical media used in the system, including any substrate, microlens, and/or fill between arrays, as well as fill used in the optical path defined by the gap $t_g$, which may include air or various other optical media.

The focal length separation of each array 104 of the pair 102 establishes that the array pair 102 implements a Fourier transform of the light emanating from the object 112. For objects at an infinite distance from the first array pair 102, $t_g$ is zero (or substantially near zero) and the Fourier transform is a phase-corrected Fourier transform from the angle space of the light emanating from the object 112 into position space (or spatial frequency space), as explained herein. The array pair 102 provides a representation of the phase-corrected Fourier transform along a plane 116 disposed between the array pairs 102, 106. The plane 116 is accordingly referenced as an intermediate transform plane. For closer object distances, the distance $t_g$ increases, such that the intermediate transform plane 116 exists at a finite distance from and between the arrays 104 and 108. As described below, for a given lenslet design, the distance or optical gap $t_g$ follows a mathematical relationship dependent on object distance along with other lenslet parameters. A stack having a fixed $t_g$ may function reasonably well over a limited range of object distances in proximity to the design object distance.

Use of two-lens in-tandem Fourier transform MLA pairs enables higher spatial frequency content (corresponding to higher angle light) to transmit into the intermediate transform plane without clipping. Such transmission, in turn, allows formation of a Sinc-like function that is more highly resolved, containing higher spatial frequency content, and limited primarily only by MLA acceptance numerical aperture (NA). This in turn allows the converging conelets out of each cell to be stitched forming a core NA without angular gaps within the solid angle of the NA. Impact on the Fourier transform due to lenslet sag profile may be reduced by using aspheric lenslet profiles, such as a conic constant in a range from about k=−0.25 to about k=−0.4, or other aspheric profiles.

The focal length separation of each array 108 of the pair 106 establishes that the array pair 106 implements a Fourier transform of the light associated with the representation at the intermediate transform plane 116. The Fourier transform is again a phase-corrected transform. The array pair 106 transforms the representation at the intermediate transform plane 116 from position space back into angle space, as well as focus convergence toward the image conjugate distance $z_2$.

The two array pairs 102, 106 are positioned relative to one another along the optical axis 114 to establish that the lens system 100 is an imaging system. That is, the distance D between the two array pairs 102, 106 establishes that the lens system 100 provides an erect image 118 of the object 112. The image 118 is provided at an image conjugate distance $z_2$ from the array pair 108.

The image conjugate distance $z_2$ is established via a function of the object conjugate distance $z_1$ for the object 112, the distance D between the array pairs 102, 106, a first pitch of the first array pair 102, a second pitch of the second array pair 106, and the common focal lengths $f_1$, $f_2$. The function establishes that the light emanating from the object 112 and passing through the constituent lenslets of the in-tandem microlens arrays of the array pairs 102, 106 converges at the image conjugate distance $z_2$. Further details regarding the function are provided hereinbelow in connection with parameters identified in FIG. 1.

For two lenses in tandem, $f_{1a}$ and $f_{1b}$, separated by distance D, the distance $s_i$ after the last lens at which an image of the input object 112, at distance $z_o$ before the first lens, occurs may be defined as $$s_i = \frac{f_{1b}(D(f_{1a} - z_o) + f_{1a}z_o)}{D(f_{1a} - z_o) + f_{1b}z_o + f_{1a}(z_o - f_{1b})}$$

However, when focal lengths $f_{1a}$ and $f_{1b}$ are configured as a Fourier Transform pair, such that $f_{1a}=f_{1b}=f_1$ and separation distance $D=f_{1a}=f_1$, then the image distance of input object A, occurs at distance $s_i$ after the last lens, which simplifies to $z_{g1}$:

$$z_{g1} = \frac{f_1(f_1(f_1 - z_o) + f_1 z_o)}{f_1(f_1 - z_o) + f_1 z_o + f_1(z_o - f_1)} = \frac{f_1^2}{z_o}$$

where $f_1$ is the focal length of each lens of the two-lens in-tandem Fourier transform pair and $z_o$ is the object distance before the first lens.

The foregoing relationship may then be extended to the array context. An array of lenslets, or cells, are formed by pitch d. A portion of light diverging from the object 112 is captured by each cell. Each cell in one array forms a two-lenslet subsystem with a cell in the other array of an array pair. For a solid angle of light from the object 112 that overfills a cell of width near pitch d, the input captured is approximately a Rect function which forms a Sinc-like function near the image of A at the intermediate transform plane defined by, or disposed at, the distance $z_{g1}$ from the second array in the array pair.

The second Fourier transform array pair 106 is placed after the first array pair 102 at gap distance optically equivalent to $t_g=2*z_{g1}$. The configuration, for examples providing a 1:1 imaging relay, thus becomes symmetric. The imaging conjugate distances provided by each subsystem are the same. The images developed by all of the subsystems converge for image formation of the object 112, at distance $z_i$, to form image 118 (see, e.g., point A' corresponding to point A on the object 112). In such cases, the imaging system becomes a 1:1 relay such that the image distance $z_i$ is substantially equal to the object distance $z_o$.

The intermediate images may be referred to as intermediate transform images of the input object 112, which occur at the intermediate transform plane near half the gap $t_g$, defined previously as distance $z_{g1}$.

The distance, or gap $t_g$, between the two array pairs 102, 106 is determinative of the imaging of a stack of cells. The cell stack includes four cells, one from each array 104, 108. Each cell stack may be considered a constituent sub-system of the lens system 100. The distance between the two array pairs 102, 106 is selected such that imaging is achieved for all rays entering the constituent sub-system at a common image conjugate distance. The distance, or gap $t_g$, increases as the object distance decreases (i.e., the object 112 becoming closer to the lens system 100). The distance, or gap $t_g$, goes to zero as the object distance goes to infinity (or very large distances relative to the dimensions of the lens system 100). In the example of FIG. 1, the two array pairs 102, 106 are spaced apart from one another by a gap 120. The distance, or gap $t_g$, for the function is thus non-zero. The gap 120 may be on an order of, or in the proximity of, the first and second common focal lengths.

The pitch of the lenslets 110 within the arrays 104, 108 governs the convergence of light from all of the lenslets 110. The lenslets 110 of the first array pair 102 have a pitch $d_1$, while the lenslets 110 of the second array pair 106 have a pitch $d_2$. The pitch is selected such that convergence of all optical information across all lenslets 110 of the arrays 104, 108 is achieved. An image is thus formed at the same image conjugate distance across all lenslets 110 of the array 104, 108. The lens system 100 is an example of an imaging system in which the lenslets 110 of both array pairs 102, 106 have a common pitch. With the pitches $d_1$, $d_2$ equal to one another, the output of the lens system 100 may be telecentric.

Telecentric output may also be provided, on one side of the optical stack, in non-equal pitch cases, i.e., when $d_1$ does not equal $d_2$. In such cases, the pitches of the lenslets 110 in each array 104 of the first array pair 102 are equal to one another, and the pitches of the lenslets 110 in each array 108 of the second array pair 106 are equal to one another. The function simplifies as follows:

$$d_2 = \frac{d_1 z_2 (f_1 + z_1)}{(f_2 + z_2) z_1}$$

The gap $t_g$ is as follows:

$$t_g = z_{g1} + z_{g2},$$

where $z_{g1} = \frac{f_1^2}{z_1}$ and $z_{g2} = \frac{f_2^2}{z_2}$.

In such case, the pitches are configured such that $d_1=d_{1b}<d_{2b}=d_2$.

Non-telecentric imaging, on both sides of the optical stack, may also be provided. The rays may be smoothly bent through the lens system 100 by adjusting the respective pitches of the cells within the arrays 104, 108. The lenslets 110 of the arrays 104, 108 may thus be registered (or aligned) with one another or non-registered. In one example, the pitches of all four arrays differ from one another. The pitch $d_1$ for the lenslets 110 becomes $d_{1a}$ and $d_{1b}$ for the first and second arrays 104 of the first array pair 102. The pitch $d_2$ for the lenslets 110 becomes $d_{2a}$ and $d_{2b}$ for the first and second arrays 108 of the second array pair 106. In one positive magnification case, $d_{2b}>d_{2a}>d_{1b}>d_{1a}$. The function then may be expressed as follows (with $z_{g1}$ and $z_{g2}$ defined as set forth above):

$$d_2 = \frac{d_{2b} f_2 z_1 + d_{1b} f_1 z_2 + d_1 z_1 z_2}{z_1 (2 f_2 + z_2)}$$

In such case, the pitches are configured such that $d_1<d_{1b}<d_{2b}<d_2$.

As shown by the examples described above, the gap $t_g$ is determinative of the imaging of each subsystem of cells, while the relative pitches of the arrays govern the convergence from all the cell subsystems.

The focal lengths of the cells within the arrays 104, 108 may also be used to adjust the image conjugate distance. Non-unity conjugate distances may be achieved when the focal lengths of the lenslets 110 within the arrays 104 are not equal to the focal lengths of the lenslets 110 within the arrays 108. In the example of FIG. 1, the focal lengths of the lenslets 110 within the arrays 104 and 108 are equal to one another.

The term "equal" is used herein to mean exactly equal and effectively equal. Effectively equal may include, for instance, parameters that are equal within a reasonable margin of error, such as a manufacturing tolerance. The parameter values thus need not be exactly equal (e.g., slightly offset) to be considered "equal" as that term is used herein. Any of the parameters described herein as equal in some examples may alternatively be "substantially equal" in other cases. Substantially equal parameter values may be intentionally or unintentionally offset by a slight amount that results in a discernable (e.g., detectable), but insignificant, effect on system output. Any of the parameters described herein as equal in some examples may alternatively be "about equal" in other cases. About equal parameter values may be intentionally or unintentionally offset by a slight amount that results in a discernable (e.g., detectable) effect on system output that may be considered significant in some applications but insignificant in other applications. For example, a slight de-focusing of system output resulting from about equal parameters may be significant in the context of a fingerprint reader, a microscope, or photolithography, but insignificant in the context of a printer or facsimile machine.

Distances referenced herein, such as the width of the gap 120, may differ in practice in accordance with the refractive index of the transmission medium. For example, the above-described functions specify a distance for the gap parameter in connection with transmission through an air gap. The actual width of the gap 120 may differ from the air gap distance if the light is propagating through a medium other than air when traversing the gap 120. The gaps and other distances may thus be optically equivalent distances. In cases using an optical medium other than air, the inner lenslet focal lengths may be adjusted to account for change in curvature required to maintain the Fourier Transform function of each pair. Increase in refractive index in the gap implies smaller lenslet curvature to maintain substantially equal effective focal length for an in-tandem MLA pair. Further, such practice is useful when it is desired to laminate both MLA pairs to form an optical stack that includes a monolithic optical stack without an air gap.

Optical terms such as "collimated", "focused", etc., are used herein to include both the exact condition described by the term as well as conditions near the exact condition. For example, light is considered to be collimated if the light rays are collimated to an effective extent for purposes of the imaging application or usage scenario involved. The resolution of the viewer may thus be taken into account when evaluating whether the optical condition (e.g., collimated, focused) is present.

A two lens setup, having lenses separated by their common focal length, forms a Fourier transform of an input Optical Transfer Function (OTF) placed at and just before the first lens, at and just after the second lens. Between these two planes, angular frequency may be transformed into spatial frequency and vice versa. As such, objects placed at infinite distance may be considered to have purely angle space content provided to the first plane, thus forming spatial content at the second plane. In such cases, a lens system imaging an object scene at infinity forms a Fourier transform as spatial frequency content at the intermediate transform plane, and the portion of gap supporting the object side lens sheet $z_{g1}$ may be zero, such that the gap $t_g$ becomes $z_{g2}$ on imager side.

However, for cases where the lens system is imaging objects at a finite distance $z_1$, the object light is no longer purely in angle space, but in a combination of angle space at a given z distance, and $z_{g1}$ is non-zero. In such cases, the transform into spatial content no longer occurs at the second lens, but is considered to be a representation of the Fourier transform at a distance near the intermediate image of object, thus at distance $z_{g1}$ past the second lenslet in the first lens assembly.

For non-telecentric cases including the effects of varying CRA versus position across sensor, the off-axis transfer functions at the intermediate transfer plane may include tilted phase, while still representing the spatial frequency content of the object scene. For this reason, the transform at the intermediate transform plane may be considered a representation of the Fourier transform, although the transform may or may not occur at the plane of the second lenslet in the object side lens assembly.

Figure 2:
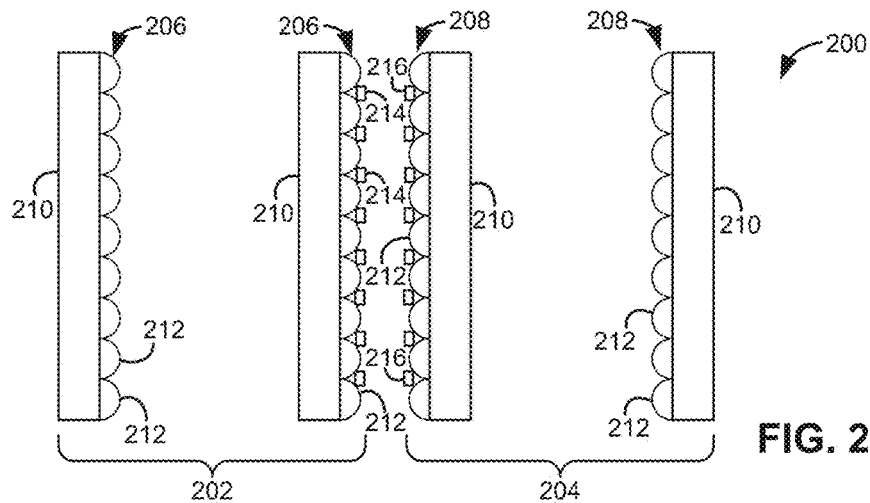
FIG. 2 is a schematic, side view of the lens system of FIG. 1 in accordance with an example having a respective in-tandem pair of microlens arrays (MLAs) for each lens array assembly.

FIG. 2 depicts a side view of a MLA-based lens system 200 in accordance with one example. As in the examples described above, the lens system 200 includes two array pairs 202, 204. The array pair 202 includes arrays 206, and the array pair 204 includes arrays 208. In this example, each array 206, 208 is disposed on a respective substrate 210. The substrates 210 may or may not be similarly configured and constructed. In one example, each substrate 210 is composed of a glass substrate having a thin microlens layer replicated on one surface using UV-cure adhesive resin, which may be cured using ultraviolet light, and a mold master, and each substrate 210 may have a similar thickness.

Each array 206, 208 includes a set of lenslets 212. In one example, each substrate 210 and set of lenslets 212 is integrally formed via injection molding. Alternatively, the lenslets 212 may be formed separately from the substrate 210 and affixed or otherwise secured thereto. For example, the lenslets 212 may be formed, and then applied to the substrates 210 with optically clear adhesive. The pitch and focal length of the lenslets 212 may be equal or offset as described above. Other techniques for forming the lenslets 212 may be used.

Surfaces may be optically coated with anti-reflective (AR) coatings to minimize loss and scatter due to Fresnel reflections. The coatings may be tailored for the visible range of wavelengths, near-IR range of wavelengths, or any other desired bandpass spectral width. In cases using UV-cure adhesives, a glass master may be utilized to minimize distortion. Other examples include injection molding in a homogenous polymer, such as acrylic or polycarbonate, compression molding of polymer sheets, and nanoprinting. For compression molding, a nickel shim may be formed of a master negative using an electroform nickel process. A master may also be formed using diamond machining, such as plunge cutting a rotating cutter having a profile form for each lenslet, or diamond turning each lenslet. For high accuracy and fill factor, a lithography based glass etching technique may be used to fabricate the MLA master.

Various profiles may be used for each lenslet 212. For example, the lenslets 212 may have aspheric or conic profiles. The extent or degree to which the profiles are aspheric or conic may vary. In some cases, the lenslets 212 may have profiles with conic constants directed to reducing aberrations and/or allowing the lens system to accommodate higher numerical apertures (NA). For example, a strong conic constant, such as $k=-0.7$ to $k=-1.0$, in one or more of the profiles is capable of improving focus on axis, thereby enabling formation of higher spatial frequency content for more central fields, while a moderate conic constant, such as $k=-0.25$ to $k=-0.4$, may provide improvement for a wide range of field locations. The profiles of the lenslets may vary within the same microlens layer and/or between layers. Further, in some cases, slight variation of focal length versus position and/or aspheric profile versus position within the array may improve imaging performance over the area of the image sensor plane. Further, the position along the optical axis, or z position, of the lenses within each array may be slightly varied versus position within the array in order to improve imaging performance, as each microlens may have characteristic best focus surfaces, such as field curvature. For instance, non-telecentric designs may benefit from such variations with respect to position across an array in a system, insofar as CRA may be varied with field angle.

The arrays 206, 208 are oriented symmetrically about the intermediate transform plane (FIG. 1). Each lenslet 212 of the arrays 206, 208 is a plano-convex structure. The planar side of each structure is adjacent the respective substrate 210. The curved side of each structure is disposed on an inward facing side of each array 206, 208 in the example of FIG. 2. The orientation of the lenslets 212 may vary from the example shown. One example is described below in connection with FIG. 3.

The lenslets 212 may be arranged in a variety of two-dimensional patterns. For example, the lenslets 212 may be disposed in a hexagonal array, a square array, or other arrangement. The lateral shape of each lenslet 212 may vary accordingly.

One or more of the arrays 206, 208 may be pattern or aperture masked. The aperture masking may be directed to limiting the acceptance of the lens system and/or reducing scattered light or stray light from outside of the desired field of view (FOV) of the system. Pattern masking may be directed to blocking ambient or other spurious light from being processed by the lens system 200. For instance, ambient light at high angles of incidence upon the lens system 200 is blocked. Blocking the high angle incident light may prevent the spurious light from hopping to a neighboring subsystem of cells. In the example of FIG. 2, the lens system 200 includes aperture stops 214 along the inner array 206 of the first array pair 202, as well as aperture stops 216 along the inner array 208 of the second array pair 204. Fewer, additional, or alternative aperture stops 214, 216 may be provided. For example, other lens systems may not include the aperture stops 216. Aperture stops may be disposed at any one or more of the layers.

The aperture stops may be provided for purposes other than reducing scattered or stray light. For example, the aperture stops may address aberrations in the lenslets of the arrays.

The location of the aperture stops may also vary from the example shown. The aperture stops or arrays may be placed only under the outer MLA layers of the stack, near the inner MLA layers of the stack, or various combinations thereof.

Aperture masking may be accomplished by using a lithographed aperture hole array layer, such as patterned deposited thin metal oxide or metal, on top of or underneath the replicated layer as by replicating over an aperture-patterned substrate surface, or one or more patterned sheets disposed within the optical stack, e.g., near the inner arrays.

The aperture stops 214, 216 may be provided via a discrete sheet or other layer disposed along the respective array 206, 208. For example, an opaque sheet secured to, or disposed along, the array 206 may include an array of apertures to define the aperture stops 214. Alternatively or additionally, the pattern masking may be provided via a layer deposited or otherwise formed on the respective substrate 210. The layer may be patterned to define the aperture stops 214, 216 before the formation of the lenslets 212.

The aperture stops 214, 216 may be embedded in, or otherwise integrated with, the lenslets 212. For instance, the material of each aperture stop 214, 216 may be deposited on the substrate 210 and then patterned before and/or in connection with the formation of the lenslets 212. Further, a perforated or 'honeycomb' sheet of limited thickness may be disposed between the pairs.

Figure 3:
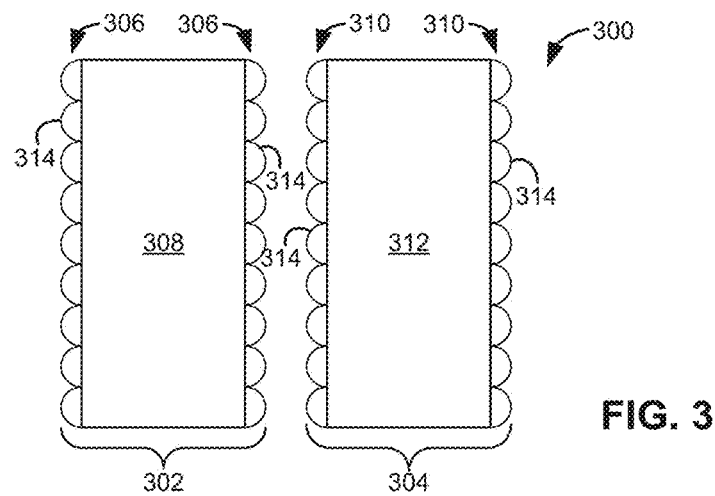
FIG. 3 is a schematic, side view of a MLA-based lens system in accordance with another example.

FIG. 3 depicts another example lens system 300 having array pairs 302, 304. In this case, arrays 306 of the pair 302 are disposed on opposite sides of a substrate 308. Arrays 310 of the pair 304 are disposed on opposite sides of another substrate 312. Each array 306, 310 includes lenslets 314, each of which includes a plano-convex structure. The curved surface of each lenslet 314 faces inward or outward in accordance with the side of the substrate 308, 312 on which the lenslet 314 is disposed.

The lenslets 314 may be arranged, shaped, formed, and otherwise configured as described above. The lens system 300 may have alternative or additional aspects in common with the examples described above. For example, in some cases, the lens system 300 includes aperture stops on one or more of the arrays 306, 310.

The arrays of the examples of FIGS. 2 and 3 may be separated from one another by air. Other media may be used. For example, low refractive index adhesive or laminate materials may be disposed between the arrays.

The lens systems may differ from the examples of FIGS. 2 and 3 in other ways. For example, the arrays of each pair may be in contact with one another. In four-substrate cases, the arrays may be in contact as a result of the thickness of the inner substrates. Lenslet orientations other than those shown in FIGS. 2 and 3 may be used.

Additional substrates or other structures may be used in other examples. For example, two substrates may be disposed before and after the array assemblies of FIG. 3 to provide, for instance, additional structural support or protection.

A four layer MLA stack may be configured to accommodate conjugate distances from infinity to close proximity. However, the gap distance $t_g$ may increase substantially for object distances approaching the focal length of the first array. In such cases, additional, outer MLAs may be added in order to enable the inner gap distance to be substantially reduced, and further provide a focus NA having no angular gaps, or substantially reduced angular gaps. Further, the outer MLAs may provide added freedom in design as each surface profile may be tailored to improve optical performance.

Various aspects of the above-described lens systems may be applied in the context of camera imaging. The nature of the array-based imaging allows the camera module to have a thin form factor. Examples of ultra-compact, low total track length, planar, phase-correct lens systems for camera imaging are described below. The lens system examples are configured to, among other things, (1) avoid apodization and thereby reduce diffractive artifacts at an image plane, (2) utilize diffraction to improve image quality, (3) improve steering and increase efficiency, (4) reduce clipping and vignetting, and (5) provide a solid, contiguous core focus cone NA that is well-stitched, having no gaps or breaks.

The camera and other lens systems may include a pair of in-tandem, Fourier Transform-corrected MLA sets as described herein. The lens system may include two or four arrays (e.g., layers) depending upon the type of microlenses. The camera lens systems may capitalize on the tradeoff of scaling down the magnitude of optical aberrations for a given cone NA diffraction limit. The above-described function establishes the parameters of the arrays, including, for instance, the focal lengths, the image and object distances, and the pitches. As described above, the cell-to-cell neighbor support of the cone NA and imaging overlap may be determinative of the relative pitch of each array.

The camera and other lens systems treat the optical path of the imaging stack as a series of transformations between object space and image space. As described above, the object is transformed into the spatial frequency domain (e.g., at the intermediate transform plane), and then transformed back into the position space as an image of the object. The transformations provide a phase correction to complete each image as a Fourier Transform. A quadratic phase correction may be provided by a pair of in-tandem Fourier Transform-corrected MLA sets, as described above.

Diffraction is addressed and utilized to improve performance. As each cell represents a sample of the object light, the intermediate plane is treated as an intermediate transform plane instead of incorrectly presuming the plane to be an intermediate image plane. This recognition avoids ignoring diffraction. The diffraction patterns at the intermediate transform plane are instead not apodized in the camera and lens systems described herein. As a result, diffraction within each cell of the cell array contributes to forming a more complete and accurate image of the object, e.g., in terms of both phase and amplitude. Solid convergence of stitching of the focus cone NA, with no gaps or breakup, is thus achievable.

Both telecentric imaging and non-telecentric imaging are provided. Telecentric systems may provide telecentric imaging at an image sensor. To that end, each lenslet within an array pair (or array) has a common pitch, as described above. Non-telecentric imaging allows for chief ray angle fanning versus position at the image sensor. The pitches of each array may be different in such cases, as described above.

Figure 4:
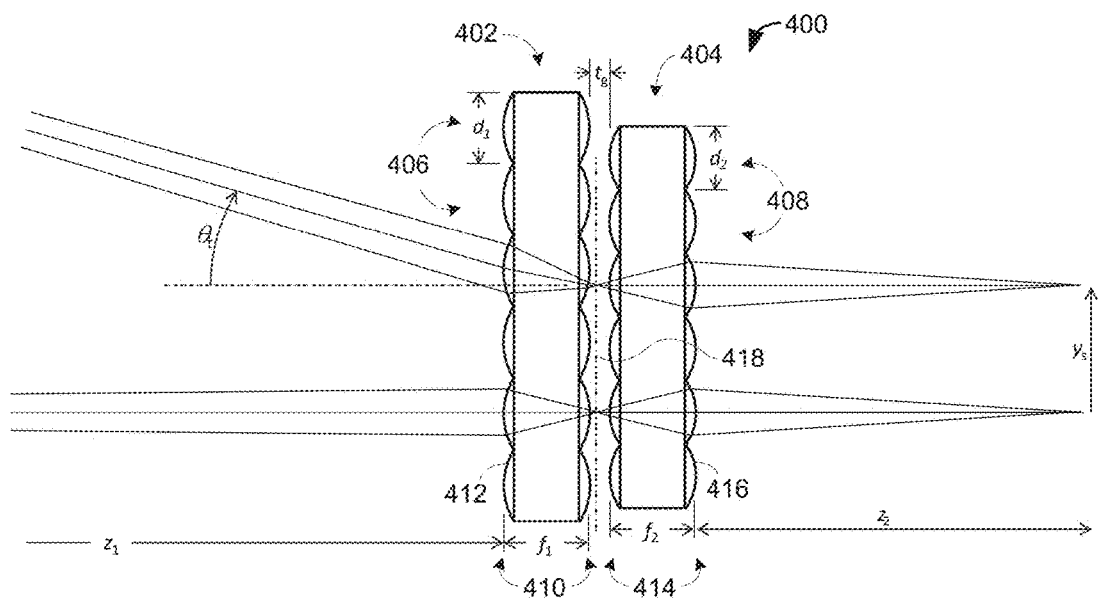
FIG. 4 is a schematic, side view of an array-based camera lens system for telecentric imaging at an image sensor in accordance with one example.

FIG. 4 shows an array-based camera lens system 400 that provides telecentric imaging at an image sensor. In this telecentric case, an angular field of view (FOV) of object light emanating from an object conjugate distance $z_1$ is focused and imaged at an image plane located at an image conjugate distance $z_2$. In some cases, an image sensor (see, e.g., FIG. 10) is disposed at the image conjugate distance to capture an image of the object light. Any type of image sensor may be used. Other types of photo-sensitive media may alternatively be disposed at the image conjugate distance.

The system 400 may be configured similarly to one or more of the examples described above. For instance, the lens system 400 includes a first lens array assembly 402 and a second lens array assembly 404. The first lens array assembly 402 includes a first plurality of cells 406. Each cell 406 is configured to exhibit a pair of first Fourier transform lenses. The second lens array assembly 404 includes a second plurality of cells 408. Each cell 408 is configured to exhibit a pair of second Fourier transform lenses.

The pitches of the cells 406, 408 of the first and second lens array assemblies 402, 404 are configured to provide telecentric imaging. In this case, the cells 406 are configured such that the first Fourier transform lenses have a pitch $d_1$, while the cells 408 are configured such that the second Fourier transform lenses have a pitch $d_2$. The pitch $d_2$ differs from (e.g., is smaller than) the pitch $d_1$, as shown in FIG. 4.

In the example of FIG. 4, the first and second lens array assemblies 402, 404 include respective microlens arrays exhibiting the requisite pitches. The first lens array assembly 402 includes a first pair of in-tandem microlens arrays 410. Each microlens array 410 of the first pair includes a respective set of constituent lenslets 412 having the pitch $d_1$. Each constituent lenslet 412 has a first common focal length $f_1$. The in-tandem microlens arrays 410 of the first pair are separated from one another along the optical axis of the lens system 400 by the first common focal length $f_1$ as described above.

The second lens array assembly 404 includes a second pair of in-tandem microlens arrays 414. Each microlens array 414 of the second pair includes a respective set of constituent lenslets 416 having the pitch $d_2$. Each constituent lenslet has a second common focal length $f_2$. The in-tandem microlens arrays 414 of the second pair are separated from one another along the optical axis of the lens system 400 by the second common focal length $f_2$.

As described above, the first and second pairs of in-tandem microlens arrays 410, 414 are positioned relative to one another along the optical axis such that the image is provided at the image conjugate distance $z_2$. In this case, the arrays 410, 414 and, thus, the first and second lens array assemblies 402, 404 are spaced apart from one another by a gap $t_g$. The spacing established by the gap $t_g$ positions the first and second lens array assemblies 402, 404 relative to one another along the optical axis of the lens system 400 such that (1) a Fourier transform of the object light is developed at a plane 418 between the first and second lens array assemblies 402, 404 and (2) an image of the object light is provided at the image conjugate distance $z_2$ from the second lens array assembly 404.

As specified above, the image conjugate distance $z_2$ is established via a function of the object conjugate distance for the object, the gap $t_g$ (or distance between the first and second lens array assemblies 402, 404), the pitches $d_1$ and $d_2$, the focal length of the cells (or constituent lenslets 412) of the first lens array assembly 402, and the focal length of the cells (or constituent lenslets 416) of the second lens array assembly 404. The function establishes that light emanating from the object and passing through the respective cells of the lens array assemblies 402, 404 converges at the image conjugate distance $z_2$. The focal lengths $f_1$, $f_2$ and other parameters may vary as described above.

One or more of the microlens arrays 410, 414 may be configured for flip-and-stitch propagation of the light emanating from the object. As a consequence of various portions of light diverging from a point from an object being accepted by neighboring cells, the fully stitched focus cone NA imaged onto an image plane at $z_2$ is dependent on supporting conelets provided by a range of neighboring cells. As the width of a ray bundle of light from an object increases, more neighboring cells are included in the stitching function, which adds each neighboring portion of a conelet as a step out by one next cell and then fill inward, until fully filled, then step out by one next cell, then fill inward until fully filled, and so on up to a point that completely fills the acceptance of the cells. The width of the ray bundle that corresponds to fully filling the acceptance of the cells, then defines the acceptance aperture of the system. In such a manner, the outermost conelets are added to the core NA in a 'flip and stitch' manner as acceptance of an input ray bundle is widened. The flip and stitch effect adds to the outer cone NA, such that if one adds a stop, the outermost conelet may have a gap, but the interior or core of the cone re-converges in a solid manner.

Figure 10:
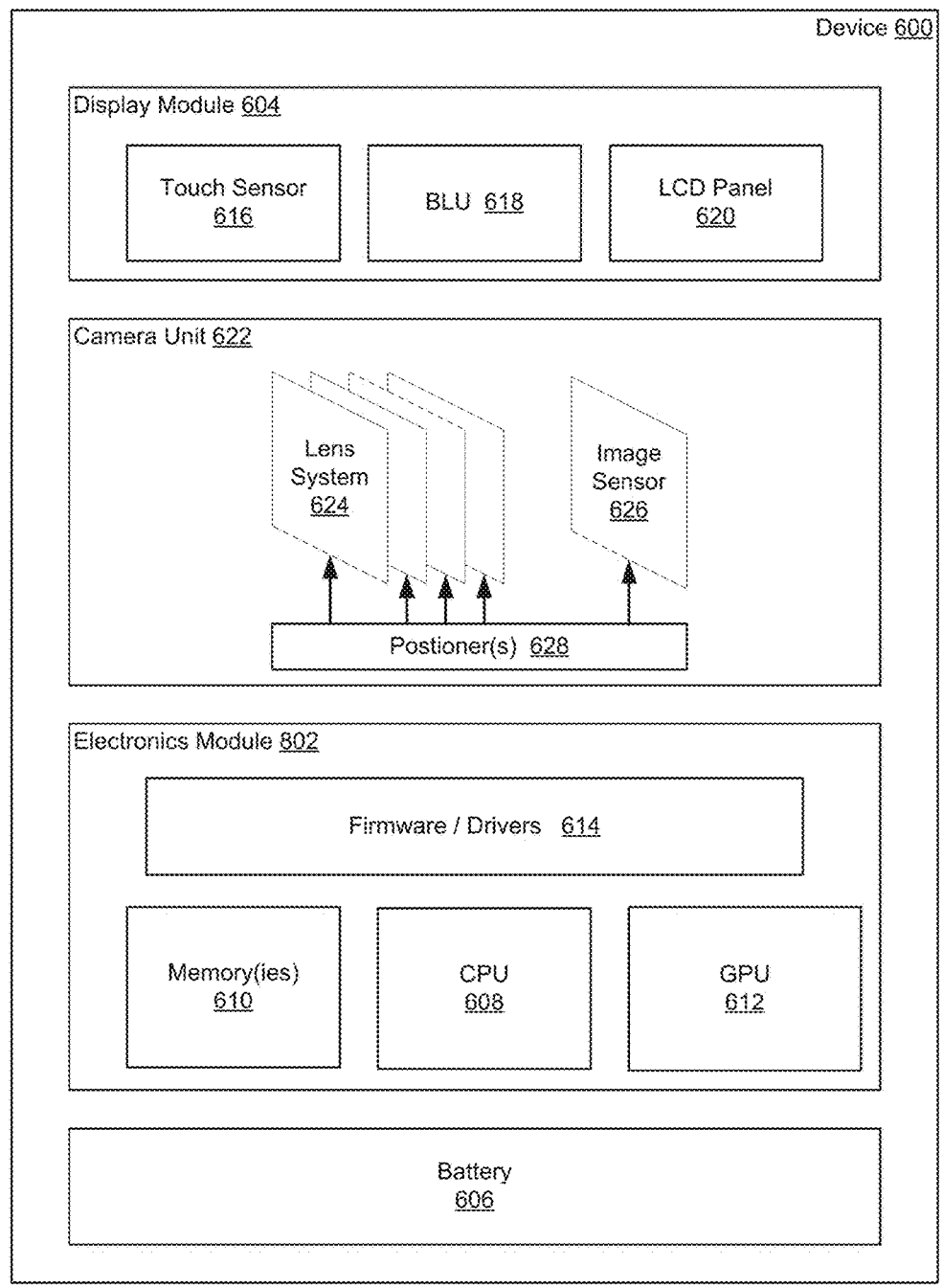
FIG. 10 is a block diagram of an electronic device having an array-based camera lens system in accordance with one example.

The lens system 400 may include one or more positioners (see, e.g., FIG. 10). The positioner(s) may be coupled to the first lens array assembly 402 and/or the second lens array assembly 404. The positioner(s) may be configured to adjust the size of the gap $t_g$. The adjustment may be useful for addressing object light of varying object conjugate distances $z_1$. In some cases, the positioner(s) include a slide, stage, or other actuator or moveable element on which the assembly 402, 404 is mounted or otherwise disposed. In other cases, an auto focus mechanism or actuator may be used to control the focus of the image at the image sensor plane, by adjusting the distance between the lens system and the image plane at the distance $z_2$. Examples include piezoelectric actuation, MEMS (micro-electromechanical systems), and/or voice coil actuation. Further, both actuation to control the relative distance between the arrays, the distance $t_g$, as well as the distance between the lens system and the image plane at $z_2$, may be used in conjunction with each other. The positioners may be integrated to any desired extent. For instance, the positioners may be controlled by a common controller or other processor (see, e.g., FIG. 10). The term "positioner" may accordingly be used herein to refer to the apparatus directed to positioning one or more elements of the lens system 400. In certain cases where a change of pitch, $d_1$ and/or $d_2$, of one or both arrays may improve focus, one or more of the arrays in the lens system may be made stretchable, such that an actuator may be added to adjust the lateral scale of one array relative to the other, in addition to the actuation of the gap $t_g$ and the focus distance $z_2$.

The positioner(s) may additionally or alternatively be configured to adjust a position of the image sensor to dispose the image sensor at the image conjugate distance $z_2$. Any type of positioner may be used. Adjusting the position of the image sensor may be useful in telecentric cases in which, for instance, the gap is not adjustable and, as a result, the image conjugate distance changes with different object conjugate distances.

The lens system 400 may be configured to accommodate object light of varying characteristics in additional or alternative ways. For instance, one or more of the respective sets of constituent lenslets 412, 416 may exhibit lenslet-by-lenslet variance within the respective set of constituent lenslets. The variance may involve varying the lenslet profile of some of the lenslets 412, 416. For example, some of the lenslets 412, 416 may have a conic (or increasingly conic) profile. Other aspheric profiles may be used. Additional or alternative lenslet variances may also be used. For instance, the refractive index of one or more materials within or adjacent to one or more of the lenslets 412, 416 may be varied. In some cases, a fill material, film or other cover is added, retracted, or otherwise modified across the array. The fill material, film, or other cover may be used to introduce various refractive index media, including dispersion. For example, multi-index or other multi-layer lenslets may be provided by, for instance, filling negative pockets or building over positive bumps.

Other aspects of the lens system 400 may vary. For instance, the arrangement of the arrays and constituent lenslets of the lens system 400 may vary from the example shown in FIG. 4. In one example, the arrays are disposed on separate substrates, as described and shown in connection with FIG. 2. The orientation of the lenslets may vary accordingly and/or in other ways. Alternatively or additionally, an aperture array is embedded in one or more of the microlens arrays, an example of which is shown and described in connection with FIG. 2.

Telecentric imaging is not limited to lens systems with pairs of microlens arrays having constituent lenslets as shown in the example of FIG. 4. For instance, the first and second lens array assemblies 402, 404 may be provided by respective arrays of GRIN structures. Examples of GRIN-based lens systems are shown and described in connection with FIGS. 8 and 9.

Figure 5:
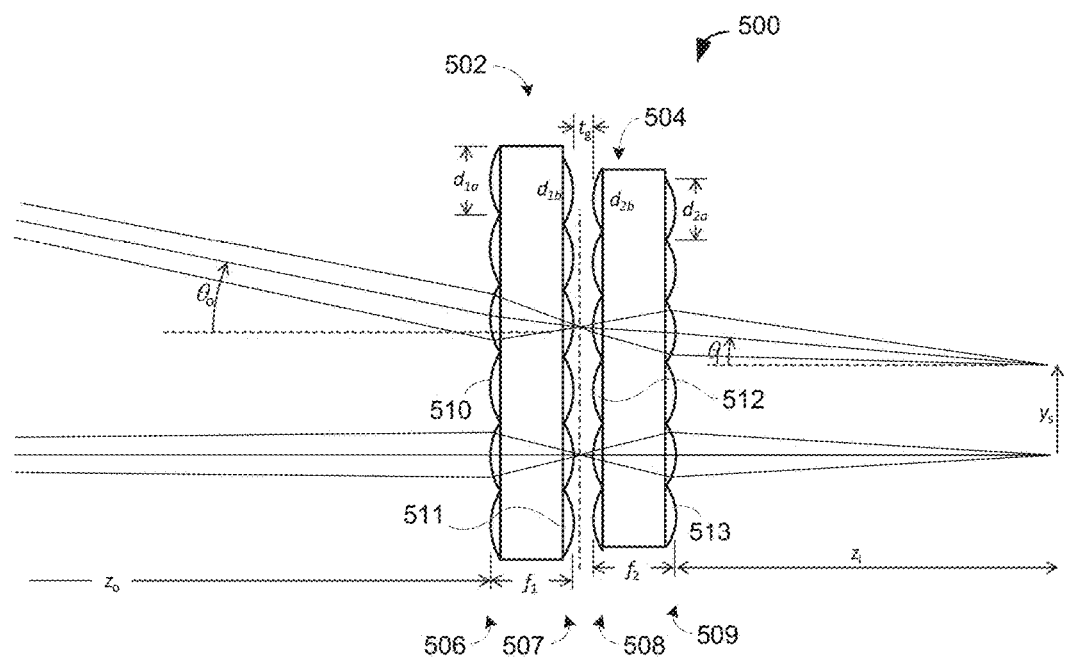
FIG. 5 is a schematic, side view of an array-based camera lens system for non-telecentric imaging at an image sensor in accordance with one example.

FIG. 5 shows an array-based camera lens system 500 that provides non-telecentric imaging at, e.g., an image sensor (FIG. 10). In the non-telecentric case, chief ray angle (CRA) fanning at the image sensor is provided as shown. As described above, the lens system 500 includes a pair of lens assemblies 502, 504. In this case, each lens assembly includes a pair of MLA layers for a total of four MLA layers 506-509. The MLA layers 506-509 may largely be configured as described above. For instance, each MLA layer 506-509 includes a respective set of lenslets 510-513. The lenslets 510, 511 have a first common focal length that establishes the distance between the first pair of MLA layers 506, 507. The lenslets 512, 513 have a second common focal length that establishes the distance between the second pair of MLA layers 508, 509.

The non-telecentric imaging of the lens system 500 is provided by one or more differences in the pitches of the respective arrays of the MLA layers 506-509. The lenslets of the MLA layers 506, 509 have respective pitches $d_{1a}$, $d_{1b}$, $d_{2b}$, $d_{2a}$. The pitches are offset from one another in a manner different than the example described above in connection with FIG. 4 (where the pitches $d_{1a}$ and $d_{1b}$ are equal to one another, and the pitches $d_{2b}$ and $d_{2a}$ are equal to one another). The manner in, and extent to, which the pitches differ from one another may be customized to provide a desired CRA fanning or other effect. In some cases, all of the pitches $d_{1a}$, $d_{1b}$, $d_{2b}$, $d_{2a}$ differ from one another. In the example of FIG. 5, the pitch decreases in the direction of light propagation. The resulting CRA fanning is opposite in direction versus position relative to that of a standard lens.

The respective pitches $d_{1a}$, $d_{1b}$, $d_{2b}$, $d_{2a}$ of the arrays of the lens system 500 are set in accordance with the above-described function. As described above, the function establishes the relationship between the pitches $d_{1a}$, $d_{1b}$, $d_{2b}$, $d_{2a}$ of the arrays and other parameters of the lens system 500.

The variance in the pitches of the four MLA layers 506-509 provides the capability to smoothly bend rays through the lens system 500. As shown in the example of FIG. 5, the lens system 500 focuses object light provided at an object angle $\theta_o$ down to an image angle $\theta_i$. Such variation may provide an effective variation in the pointing angle of the chief ray angle (CRA) versus field position across the image plane at the position $z_i$ (or $z_2$), and the ratio of field angle to CRA versus position at the image sensor may be adjusted by selection of an interdependent set of pitches $d_{1a}$, $d_{1b}$, $d_{2b}$, and $d_{2a}$.

Other pitch arrangements may be used. For example, some lens systems may exhibit increasing pitch across one or more of the array layers 506-509. In some cases, only the microlens arrays of the first pair of MLA layers 506, 507 differ from one another. In those cases, the pitches d1a and d1b are different, but the pitches d2a and d2b are equal to one another, and may or may not be equal to one of the pitches d1a and d1b. In other cases, only the microlens arrays of the second pair of MLA layers 508, 509 differ from one another. In still other cases, at least two of the microlens arrays of the first pair and the second pair have different pitches. Arrangements in which respective pitches of the arrays of the layers 506, 507 differ from respective pitches of the arrays of the layers 508, 509 may provide telecentric imaging as described above.

The first and second pairs of in-tandem microlens arrays may be separated from one another along an optical axis of the lens system by a gap $t_g$. A positioner (see, e.g., FIG. 10) may be coupled to one or both of the first pair and second pair of assemblies 502, 504. The positioner may be configured to adjust the size of the gap in various ways, as described above. The positioner may alternatively or additionally be coupled to an image sensor as described above. For a lens system having distance $t_g$ set for a desired object distance, an autofocus actuator, such as a voice-coil or MEMS or piezoelectric actuator, may be used to achieve auto focus, by control over the distance $z_i$ (or $z_2$). Further, a combined actuation including relative adjustment of the distance $t_g$ as well as the relative distance $z_i$ (or $z_2$) may be used to achieve focus.

The lens system 500 may vary in the ways described above in connection with the telecentric lens system 400 of FIG. 4. For instance, one or more of the microlens arrays may exhibit lenslet-by-lenslet variance. One example of lenslet-by-lenslet variance is a lenslet profile variance. Alternative or additional examples involve variation of focal length as a function of position and/or variation of position along the optical axis, or z position, as described above. Alternatively or additionally, an aperture array is embedded in one of the in-tandem microlens arrays of one or more of the first pair and the second pair, an example of which is shown and described in connection with FIG. 2. One or more of the microlens arrays may alternatively or additionally be configured for flip-and-stitch propagation of the light emanating from the object.

FIGS. 6-9 depict a number of ray tracings that show that, in both the telecentric and non-telecentric cases, the focus cone NA is stitched nicely with no gaps or breakup, for the paraxial case. As the input bundle from object/angle space is expanded, a flip and stitch effect adds to the outer cone NA, such that if aperture stops are added, the outermost conelet may have a gap, but the heart or core of the cone reconverges solid.

Figure 6:
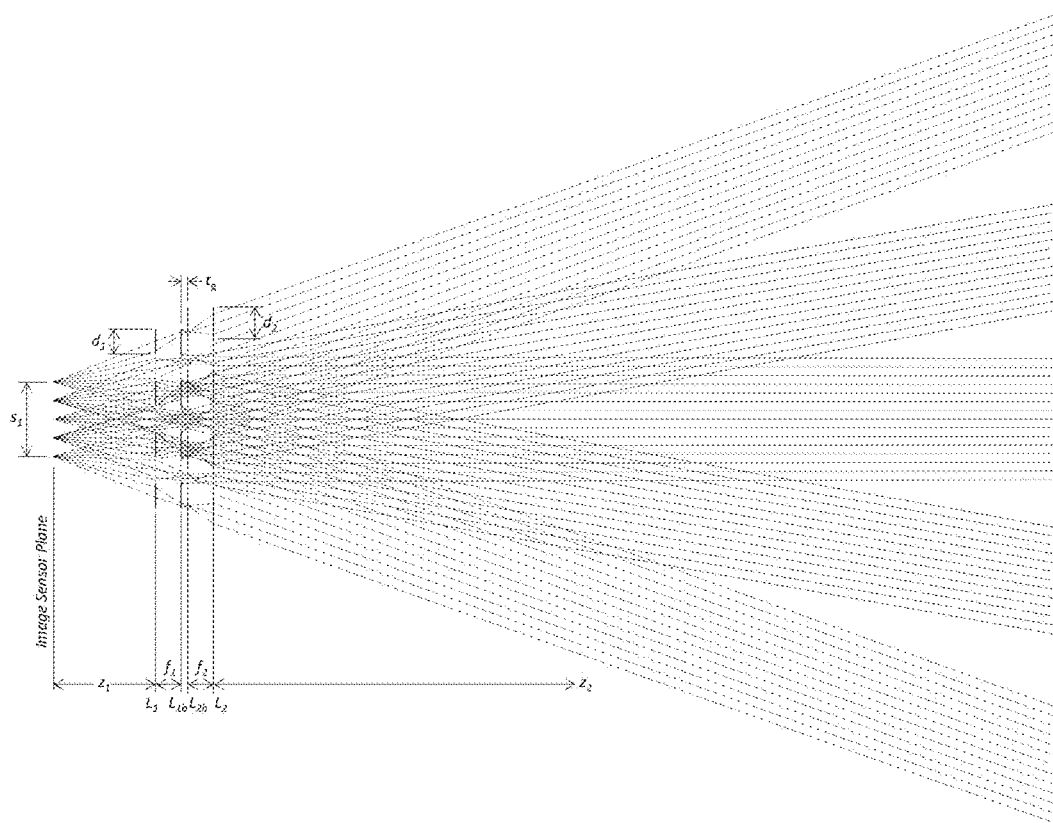
FIG. 6 is a ray trace diagram for an array-based camera lens system that provides telecentric focus on an image sensor in accordance with one example.
Figure 7:
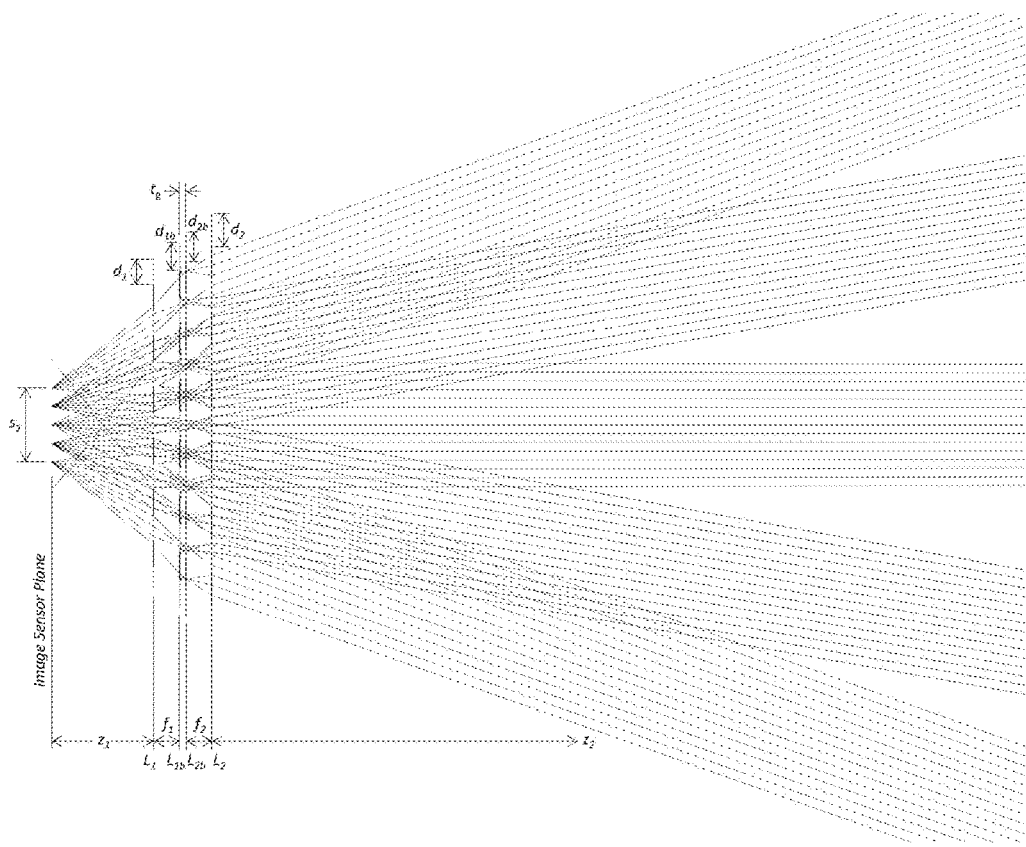
FIG. 7 is a ray trace diagram for an array-based camera lens system that provides non-telecentric focus on an image sensor in accordance with one example.

FIG. 6 shows an array-based camera lens system that provides telecentric focus on an image sensor. The lens system may be configured as described above and shown in connection with, for instance, FIG. 4. FIG. 7 shows an array-based camera lens system that provides a non-telecentric focus on an image sensor. The lens system may be configured as described above and shown in connection with, for instance, FIG. 5.

Figure 8:
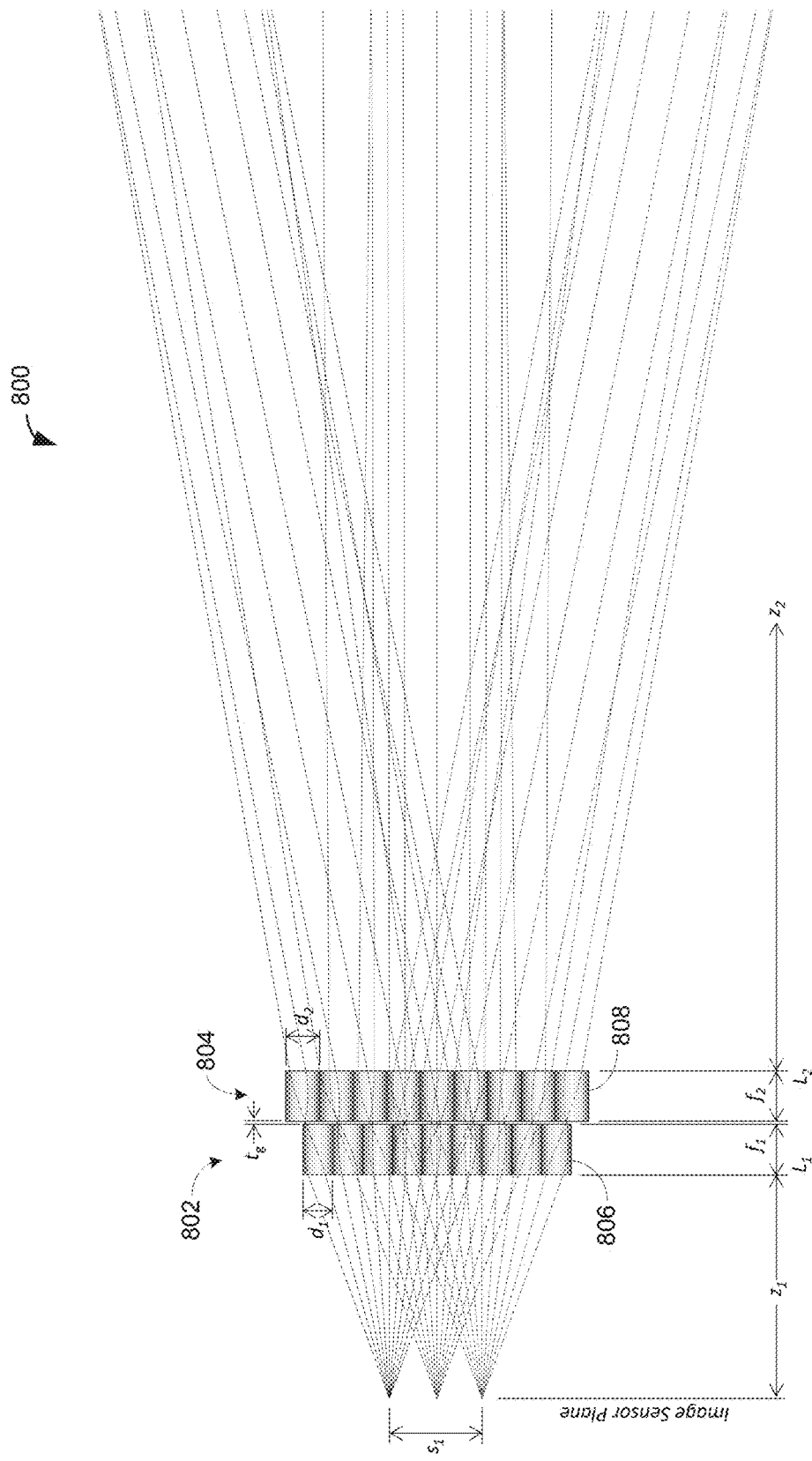
FIG. 8 is a ray trace diagram for a graded-index (GRIN) array-based camera lens system for infinite conjugate distances in accordance with one example.
Figure 9:
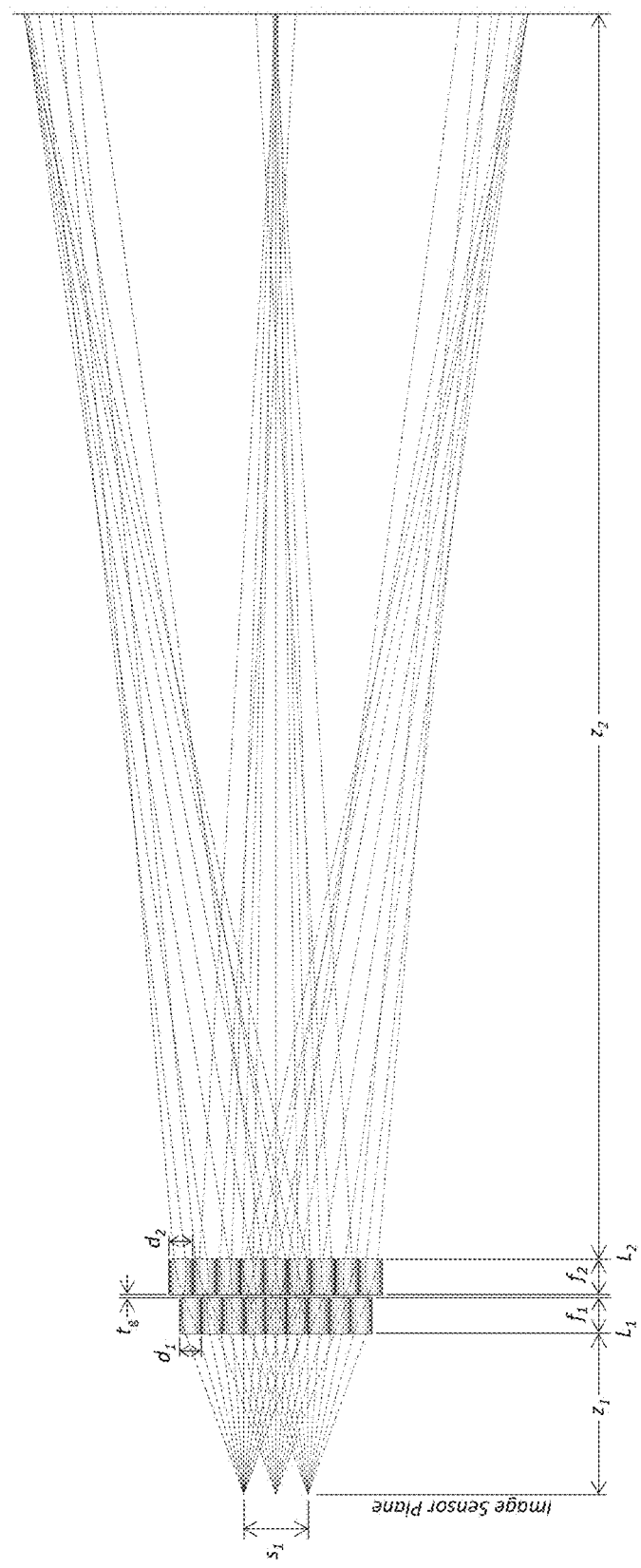
FIG. 9 is a ray trace diagram for a GRIN array-based camera lens system for finite conjugate distances in accordance with one example.

FIGS. 8 and 9 show GRIN array-based examples of the array-based camera lens systems. In each GRIN array-based example, the lens system includes two array assemblies (e.g., plates). Each array assembly includes an array of GRIN microlensing structures. Each plate has a thickness to provide the equivalent function of a Fourier transform lens pair. While 0.25p pitch GRIN lenses, having orthogonal and flat input and output faces provide an FT-equivalent cell, imaging performance of the outer rays may be further improved by adding a non-flat, aspheric profile to one or more of the faces of each GRIN lens within each array.

In the GRIN examples of FIGS. 8 and 9, each GRIN microlensing structure provides one of the cells of the lens array assembly. For example, as shown in FIG. 8, a lens system 800 may include a first lens array assembly 802 and a second lens array assembly 804. Each lens array assembly 802 includes a respective array of graded-index microlensing structures 806, 808. Each graded-index microlensing structure 806 of one array corresponds with a respective cell of one of the assemblies 802, 804. As a result, each GRIN microlensing structure is configured to exhibit, or act as, a pair of Fourier transform lenses. For instance, a parabolic refractive index profile (versus radial position from the center of each GRIN lens) enables each cell to function as a series of two in-tandem Fourier transform pairs, in order to satisfy the above-described constraints of (1) image conjugate formation for each cell and (2) convergence of imaging from multiple cells. Each assembly may thus be configured as a plate having a thickness that provides the equivalent function of the above-described Fourier transform cells formed via a lenslet pair.

For given total track length (TTL) between image conjugates, the object and image distances may be placed by design to coincide with the outer faces of the GRIN lens length, thus having image conjugates at the outer surfaces, or may be placed at an air gap distance from each of the two outer surfaces. However, the structures 806 are unlike previous GRIN arrays used for image transfer that have been based on designing a single GRIN lens length, thus only functioning for a specific pair of conjugate distances. By realizing herein that a fundamental element required in enabling the formation of images in array-based imaging is a series of two Fourier Transform (FT) equivalent subsystems within each cell of the array, and the Fourier Transform equivalent length for a GRIN lens may be defined as the length for which a collimated input beam forms a focus at the second output surface of the GRIN lens, an air gap (zero to non-zero) defined by image conjugate relations may be disposed between the two Fourier Transform equivalent length GRIN arrays in order to provide array-based imaging, which may add versatility of the system to be adjusted for any pair of equal image conjugate distances using two FT-equivalent length GRIN arrays which have the same effective focal length, and further may be adjusted to support unequal conjugate distances by use of two FT equivalent length GRIN arrays which have different focal length. Such arrays may be made thinner by use of GRIN fibers or drawing an array of GRIN rods into a boule having accurate placement of array spacing, then slicing and polishing faces, in a similar fashion as coherent fiber optic faceplates are fabricated, but with tight control of pitch layout. Further, while a GRIN lens is a lens that exhibits a continuous lensing effect or optical power anywhere along its length, a Fourier Transform equivalent subsystem may also be formed using two or more lens arrays. While a single lens array may be used to form an array of output images which appear to be Fourier Transforms in terms of intensity, these are not Fourier transforms in terms of phase, or telecentrically corrected upon output. The simplest form of an FT equivalent subsystem would then include two lenses having the same focal length placed in tandem at a separation distance equal to the effective focal length. However, it is clear from the GRIN lens FT equivalent length case explained above, that more than two lenses having various optical power may be used in series to achieve the equivalent function of a FT-equivalent subsystem. The simplest case of using microlens arrays to achieve array-based imaging involves use of two in-tandem Fourier Transform pairs of microlenses, having an air gap or optical path length gap distance defined by image conjugate relations which will be defined below. In this way, any lens array, including microlens arrays or GRIN lens arrays or GRIN microlens arrays, may be utilized to form an imaging system, as explained herein.

In any of the above-described examples, extra-mural absorption (EMA) glass may be used to block light from encountering the edge of an adjacent cell. The EMA glass may be disposed between adjacent arrays and/or embedded within one or more of the arrays. Other absorbing coatings or layers may be used.

Any of the above-described examples may be configured to serve as a one-dimensional lens system or a two-dimensional lens system. The drawing figures depict the arrays schematically and in simplified form for ease in illustration.

Thus the drawing figures should be understood to depict either one-dimensional lenticular arrays or two-dimensional microlens arrays.

FIG. 10 shows an electronic device 600 in which the array-based imaging of the above-described examples may be incorporated in connection with a camera lens. The electronic device 600 has an electronics module 602 and a display module 604 (or subsystem), and a battery 606. The electronic device 600 may include additional, fewer, or alternative components. For example, the display module 604 may be integrated with the electronics module 602 and/or other components of the electronic device 600 to a varying extent. For instance, the electronics module 602 and/or the display module 604 may include a graphics subsystem of the electronic device 600. Any number of display modules or systems may be included. In this example, the device 600 includes a processor 608 and one or more memories 610 separate from the display module 604. The processor 608 and the memories 610 may be directed to executing one or more applications implemented by the device 600. The display module 604 generates a user interface for an operating environment (e.g., an application environment) supported by the processor 608 and the memories 610. The processor 608 may be a general-purpose processor, such as a central processing unit (CPU), or any other processor or processing unit. Any number of such processors or processing units may be included.

In the example of FIG. 10, the electronics module 602 includes a graphics processing unit (GPU) 612 and firmware and/or drivers 614. The GPU 612 may be dedicated to graphics- or display-related functionality and/or provide general processing functionality, which may or may not include graphics-related processing in connection with fingerprint detection. Some of the components of the electronics module 602 may be integrated. For example, the processor 608, the one or more of the memories 610, the GPU 612, and/or the firmware 614 may be integrated as a system-on-a-chip (SoC) or application-specific integrated circuit (ASIC). The electronics module 602 may include additional, fewer, or alternative components. For example, the electronics module 602 may not include a dedicated graphics processor, and instead rely on the CPU 608 or other general-purpose processor to support the graphics-related functionality of the electronic device 600. The electronics module 602 may include additional memory (or memories) to support display-related and/or fingerprint detection processing.

In the example of FIG. 10, the display module 604 includes a touch sensor 616, a backlight unit (BLU) 618, and an LCD panel or unit 620. The touch sensor 616, the backlight unit 616, and/or the LCD unit 620 may be directed to forming a display separate from, or integrated with to any desired extent, the camera unit hardware. Additional, fewer, or alternative display components may be provided. For example, in some cases, the display module 604 does not include a touch sensor unit.

The electronic device 600 includes a camera unit 622 having a lens system 624. The lens system 624 may be configured in accordance with one or more of the examples described above. As described above, the lens system 624 relays the object light to an input plane of an image sensor 626. In the example of FIG. 10, the camera unit 622 also includes one or more positioners 628 (e.g., actuators). The positioners 628 may be configured to adjust one or more parameters of the lens system 624.

The device 600 may be configured as one of a wide variety of computing devices, including, but not limited to, handheld or wearable computing devices (e.g., tablets and watches), communication devices (e.g., phones), laptop or other mobile computers, personal computers (PCs), and other devices. The device 600 may also be configured as an electronic display device, such as a computer monitor, a television, or other display or visual output device. In such cases, the device 600 may not include one or more of the above-described components, such as the battery 606.

In one aspect, a lens system includes a first lens array assembly including a first plurality of cells, each cell of the first plurality of cells configured to exhibit a pair of first Fourier transform lenses, and a second lens array assembly including a second plurality of cells, each cell of the second plurality of cells configured to exhibit a pair of second Fourier transform lenses. The first Fourier transform lenses have a first pitch. The second Fourier transform lenses have a second pitch differing from the first pitch. The first and second lens array assemblies are positioned relative to one another along an optical axis of the lens system such that a representation of a Fourier transform of light from an object is developed at a plane between the first and second lens array assemblies and an image of the object is provided at an image conjugate distance from the second lens array assembly.

In another aspect, a lens system includes a first pair of in-tandem microlens arrays, each microlens array of the first pair including a respective set of lenslets, each lenslet having a first common focal length, a second pair of in-tandem microlens arrays, each microlens array of the second pair including a respective set of lenslets, each lenslet having a second common focal length, the first and second pairs of in-tandem microlens arrays separated from one another along an optical axis of the lens system by a gap, and a positioner coupled to one or both of the first pair and second pair, the positioner configured to adjust a size of the gap. The in-tandem microlens arrays of the first pair are separated from one another along the optical axis by the first common focal length such that the microlens arrays of the first pair are configured to provide a representation of a Fourier transform of light emanating from an object, the representation provided along a plane disposed in the gap. The in-tandem microlens arrays of the second pair are separated from one another along the optical axis of the lens system by the second common focal length such that the microlens arrays of the second pair are configured to provide an image of the object via Fourier transformation of the representation. The in-tandem microlens arrays of the first pair, the second pair, or both the first and second pairs, have different pitches.

In yet another aspect, a camera includes a first pair of in-tandem microlens arrays, each microlens array of the first pair including a respective set of lenslets, each lenslet having a first common focal length, a second pair of in-tandem microlens arrays, each microlens array of the second pair including a respective set of lenslets, each lenslet having a second common focal length, the first and second pairs of in-tandem microlens arrays separated from one another by a gap, an image sensor disposed at an image conjugate distance from the second pair of in-tandem microlens arrays, and a positioner coupled to, and configured to adjust a position of, one or more of the first pair, the second pair, and the image sensor. The in-tandem microlens arrays of the first pair are separated from one another by the first common focal length such that the microlens arrays of the first pair are configured to provide a representation of a Fourier transform of light emanating from an object, the representation provided along a plane disposed in the gap. The in-tandem microlens arrays of the second pair are separated from one another by the second common focal length such that the microlens arrays of the second pair are configured to provide an image of the object via Fourier transformation of the representation. The first and second pairs of in-tandem microlens arrays are positioned relative to one another such that the image of the object is provided at an image conjugate distance from the second pair of in-tandem microlens arrays. At least two of the microlens arrays of the first pair and the second pair have different pitches.

In connection with any one of the aforementioned aspects, the systems and devices may alternatively or additionally include any combination of one or more of the following aspects or features. The image conjugate distance is established via a function of an object conjugate distance for the object, a distance between the first and second lens array assemblies, the first and second pitches, a first focal length of the first plurality of cells, and a second focal length of the second plurality of cells. The function establishes that light emanating from the object and passing through the respective cells of the first and second plurality of cells converges at the image conjugate distance. The first and second lens array assemblies are spaced apart from one another by a gap. The lens system further includes a positioner coupled to the first lens array assembly, the second lens array assembly, or both the first and second lens array assemblies, the positioner being configured to adjust a size of the gap. The first lens array assembly includes a first pair of in-tandem microlens arrays, each microlens array of the first pair comprising a respective set of constituent lenslets having the first pitch, each constituent lenslet having a first common focal length. The second lens array assembly includes a second pair of in-tandem microlens arrays, each microlens array of the second pair comprising a respective set of constituent lenslets having the second pitch, each constituent lenslet having a second common focal length. The in-tandem microlens arrays of the first pair are separated from one another along an optical axis of the lens system by the first common focal length. The in-tandem microlens arrays of the second pair are separated from one another along the optical axis of the lens system by the second common focal length. The first and second pairs of in-tandem microlens arrays are positioned relative to one another along the optical axis such that the image is provided at the image conjugate distance. One or more of the respective sets of constituent lenslets exhibits lenslet-by-lenslet variance within the respective set of constituent lenslets. The lenslet-by-lenslet variance is a lenslet profile variance. The lens system further includes an image sensor disposed at the image conjugate distance. The lens system further includes a positioner configured to adjust a position of the image sensor to dispose the image sensor at the image conjugate distance. The first lens array assembly includes a first array of graded-index microlensing structures. Each graded-index microlensing structure of the first array corresponds with a respective one of the first plurality of cells. The second lens array assembly includes a second array of graded-index microlensing structures. Each graded-index microlensing structure of the second array corresponds with a respective one of the second plurality of cells. The lens system further includes an aperture array embedded in one of the in-tandem microlens arrays of one or more of the first pair and the second pair. One or more of the microlens arrays is configured for flip-and-stitch propagation of the light emanating from the object.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A lens system comprising:
a first lens array assembly comprising a first plurality of cells, each cell of the first plurality of cells configured to exhibit a pair of first Fourier transform lenses; and
a second lens array assembly comprising a second plurality of cells, each cell of the second plurality of cells configured to exhibit a pair of second Fourier transform lenses;
wherein:
the first Fourier transform lenses have a first pitch;
the second Fourier transform lenses have a second pitch differing from the first pitch; and
the first and second lens array assemblies are positioned relative to one another along an optical axis of the lens system such that a representation of a Fourier transform of light from an object is developed at a plane between the first and second lens array assemblies and an image of the object is provided at an image conjugate distance from the second lens array assembly.

2. The lens system of claim 1, wherein:
the image conjugate distance is established via a function of an object conjugate distance for the object, a distance between the first and second lens array assemblies, the first and second pitches, a first focal length of the first plurality of cells, and a second focal length of the second plurality of cells; and
the function establishes that light emanating from the object and passing through the respective cells of the first and second plurality of cells converges at the image conjugate distance.

3. The lens system of claim 1, wherein the first and second lens array assemblies are spaced apart from one another by a gap.

4. The lens system of claim 3, further comprising a positioner coupled to the first lens array assembly, the second lens array assembly, or both the first and second lens array assemblies, the positioner being configured to adjust a size of the gap.

5. The lens system of claim 1, wherein:
the first lens array assembly comprises a first pair of in-tandem microlens arrays, each microlens array of the first pair comprising a respective set of constituent lenslets having the first pitch, each constituent lenslet having a first common focal length;
the second lens array assembly comprises a second pair of in-tandem microlens arrays, each microlens array of the second pair comprising a respective set of constituent lenslets having the second pitch, each constituent lenslet having a second common focal length;
the in-tandem microlens arrays of the first pair are separated from one another along an optical axis of the lens system by the first common focal length;
the in-tandem microlens arrays of the second pair are separated from one another along the optical axis of the lens system by the second common focal length; and the first and second pairs of in-tandem microlens arrays are positioned relative to one another along the optical axis such that the image is provided at the image conjugate distance.

6. The lens system of claim 5, wherein one or more of the respective sets of constituent lenslets exhibits lenslet-by-lenslet variance within the respective set of constituent lenslets.

7. The lens system of claim 6, wherein the lenslet-by-lenslet variance is a lenslet profile variance.

8. The lens system of claim 1, further comprising an image sensor disposed at the image conjugate distance.

9. The lens system of claim 8, further comprising a positioner configured to adjust a position of the image sensor to dispose the image sensor at the image conjugate distance.

10. The lens system of claim 1, wherein:
the first lens array assembly comprises a first array of graded-index microlensing structures;
each graded-index microlensing structure of the first array corresponds with a respective one of the first plurality of cells;
the second lens array assembly comprises a second array of graded-index microlensing structures; and
each graded-index microlensing structure of the second array corresponds with a respective one of the second plurality of cells.

11. A lens system comprising:
a first pair of in-tandem microlens arrays, each microlens array of the first pair comprising a respective set of lenslets, each lenslet having a first common focal length;
a second pair of in-tandem microlens arrays, each microlens array of the second pair comprising a respective set of lenslets, each lenslet having a second common focal length, the first and second pairs of in-tandem microlens arrays separated from one another along an optical axis of the lens system by a gap; and
a positioner coupled to one or both of the first pair and second pair, the positioner configured to adjust a size of the gap;
wherein:
the in-tandem microlens arrays of the first pair are separated from one another along the optical axis by the first common focal length such that the microlens arrays of the first pair are configured to provide a representation of a Fourier transform of light emanating from an object, the representation provided along a plane disposed in the gap;
the in-tandem microlens arrays of the second pair are separated from one another along the optical axis of the lens system by the second common focal length such that the microlens arrays of the second pair are configured to provide an image of the object via Fourier transformation of the representation; and
the in-tandem microlens arrays of the first pair, the second pair, or both the first and second pairs, have different pitches.

12. The lens system of claim 11, wherein one or more of the microlens arrays exhibits lenslet-by-lenslet variance.

13. The lens system of claim 12, wherein the lenslet-by-lenslet variance is a lenslet profile variance.

14. The lens system of claim 11, wherein respective pitches of the in-tandem microlens arrays of the first pair have respective pitches that differ from respective pitches of the in-tandem microlens arrays.

15. The lens system of claim 11, further comprising an aperture array embedded in one of the in-tandem microlens arrays of one or more of the first pair and the second pair.

16. The lens system of claim 11, wherein one or more of the microlens arrays is configured for flip-and-stitch propagation of the light emanating from the object.

17. A camera comprising:
a first pair of in-tandem microlens arrays, each microlens array of the first pair comprising a respective set of lenslets, each lenslet having a first common focal length;
a second pair of in-tandem microlens arrays, each microlens array of the second pair comprising a respective set of lenslets, each lenslet having a second common focal length, the first and second pairs of in-tandem microlens arrays separated from one another by a gap;
an image sensor disposed at an image conjugate distance from the second pair of in-tandem microlens arrays; and
a positioner coupled to, and configured to adjust a position of, one or more of the first pair, the second pair, and the image sensor;
wherein:
the in-tandem microlens arrays of the first pair are separated from one another by the first common focal length such that the microlens arrays of the first pair are configured to provide a representation of a Fourier transform of light emanating from an object, the representation provided along a plane disposed in the gap;
the in-tandem microlens arrays of the second pair are separated from one another by the second common focal length such that the microlens arrays of the second pair are configured to provide an image of the object via Fourier transformation of the representation;
the first and second pairs of in-tandem microlens arrays are positioned relative to one another such that the image of the object is provided at an image conjugate distance from the second pair of in-tandem microlens arrays; and
at least two of the microlens arrays of the first pair and the second pair have different pitches.

18. The lens system of claim 17, wherein the image conjugate distance is established via a function of an object conjugate distance for the object, a distance between the first and second pairs, the first and second common focal lengths, the pitches of the in-tandem microlens arrays of the first and second pairs.

19. The lens system of claim 17, wherein all of the microlens arrays of the first and second pairs have different pitches from one another.

20. The lens system of claim 17, wherein one or more of the microlens arrays exhibits lenslet-by-lenslet profile variance.

* * * * *